Jan. 2, 1934.  R. DE ANGELIS  1,941,827
GRANULATING MACHINE
Original Filed Jan. 24, 1931  3 Sheets-Sheet 1
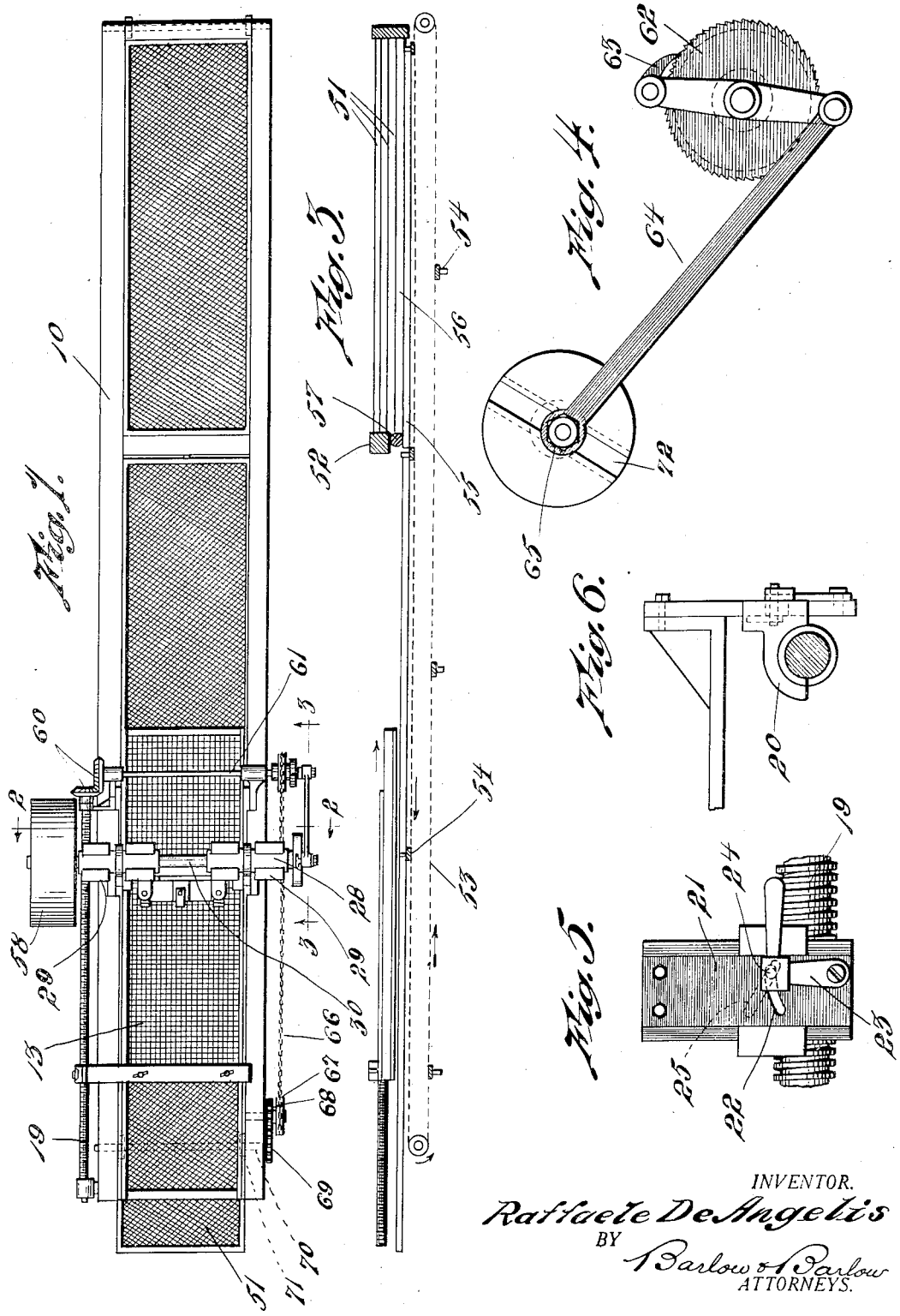
INVENTOR.
Raffaele De Angelis
BY Barlow & Barlow
ATTORNEYS.

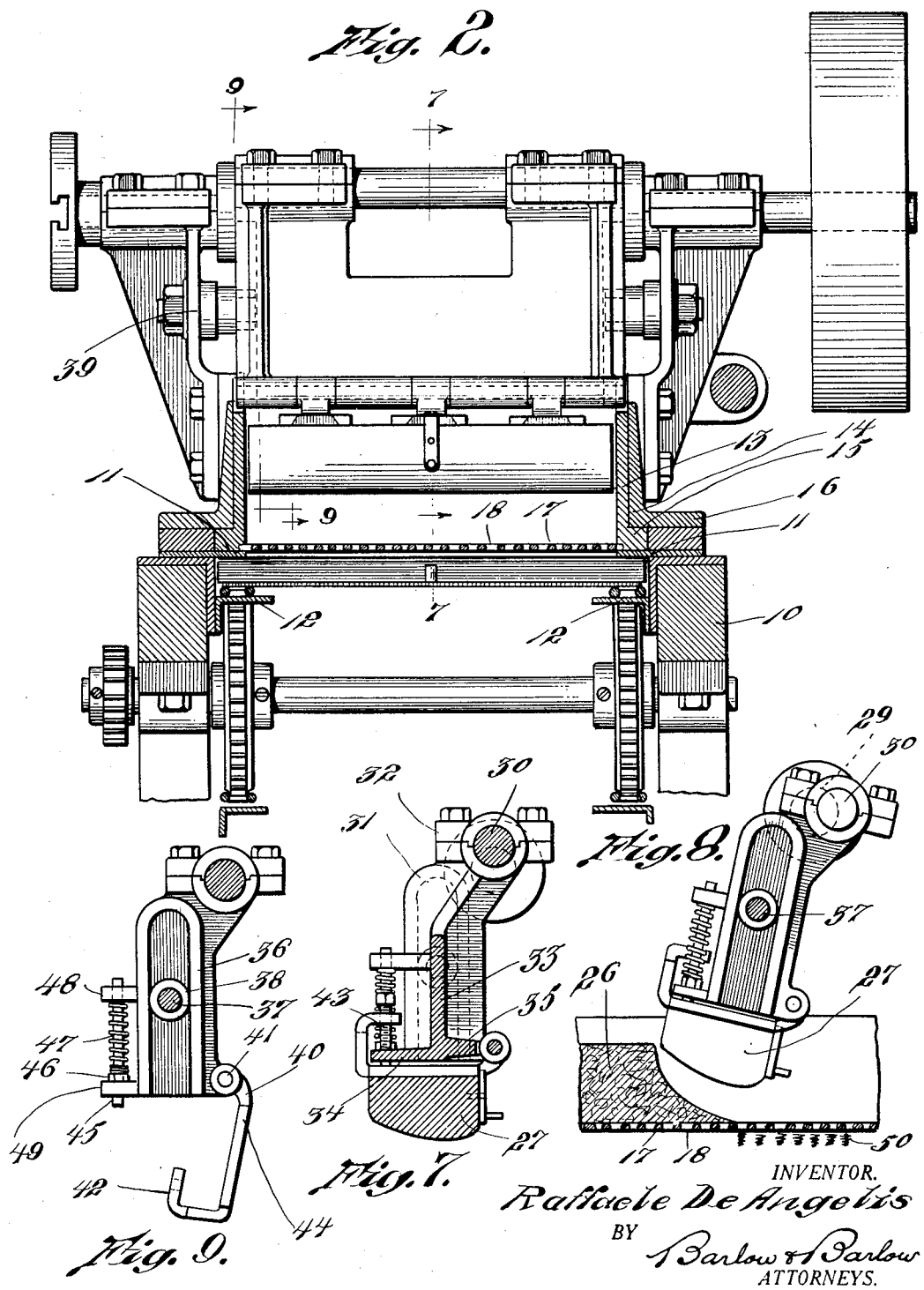

Jan. 2, 1934.    R. DE ANGELIS    1,941,827
GRANULATING MACHINE
Original Filed Jan. 24, 1931    3 Sheets-Sheet 3

INVENTOR.
Raffaele DeAngelis
BY
Barlow & Barlow
ATTORNEYS.

Patented Jan. 2, 1934

1,941,827

UNITED STATES PATENT OFFICE 1,941,827

GRANULATING MACHINE

Raffaele De Angelis, Providence, R. I.

Application January 24, 1931, Serial No. 510,994
Renewed November 10, 1933

5 Claims. (Cl. 146—179)

This invention relates to a granulating machine, and has for its object to mechanically form granules of a character such as are formed by hand.

Another object of the invention is to mechanically act upon the work with generally the same movement as a hand operation of manipulating such material.

Another object of the invention is the provision of a pestle member which will be resilient in its action to prevent breaking or distorting of parts provided the paste does not yield to the pressure applied.

Another object of the invention is to obtain a smooth action of the pestle member along the screen or paste supporting surface.

Another object of the invention is to operate upon the paste without stirring or unduly subjecting the mixture to the action of the air until pressed into granular form.

Another object of the invention is the provision of carrying means for the paste and collecting means for the granules which will be mechanically moved so as to be operated from a single end of the machine, thus providing a machine requiring the minimum attention from an operator.

A further object of the invention is the provision of a magazine which may be loaded to mechanically supply collecting trays as used.

A still further object of the invention is the provision of adjustment of the parts for varying the synchronization of their movement and vary the size of the granules formed.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a top plan view of the machine;

Fig. 2 is a section on line 2—2 of Figure 1;

Fig. 3 is a diagrammatic view showing the relative position of the trays and their operating mechanism taken in the relation of a side elevation of the machine shown in Figure 1;

Fig. 4 is a detail view showing the pawl and ratchet mechanism for feeding the paste to the carrier;

Fig. 5 is a detail view showing the detachable connection to the threaded shaft which is operated by the pawl and ratchet mechanism;

Fig. 6 is a detail of the structure shown in Figure 5 looking at right angles thereto;

Fig. 7 is a sectional detail on line 7—7 of Figure 2;

Fig. 8 is an elevational view of the structure shown in Figure 7 in its operative relation to the paste;

Fig. 9 is an end elevation of the operating head member looking on substantially line 9—9 of Figure 2 with the remaining parts of the machine removed and showing the pestle member as detached from the head;

Figure 11:
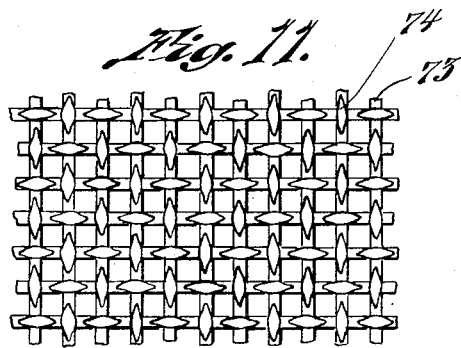
Fig. 11 is a fragmental plan view of a portion of the screen for supporting the paste and through which it is forced.
Figure 12:
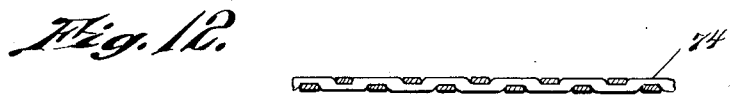
Fig. 12 is a section thereof.
Figure 10:
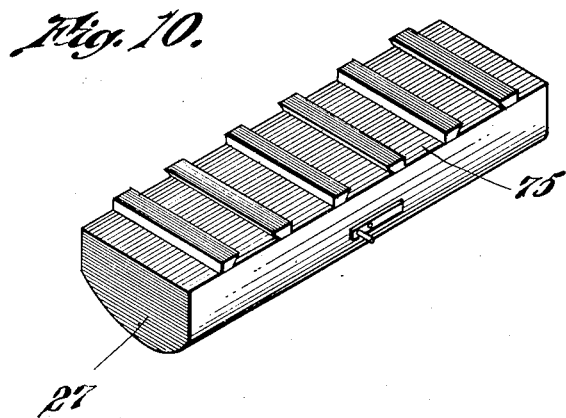
Fig. 10 is a perspective view of the pestle member.

This machine is used for forming granules of such pharmaceutical preparation as citrate of magnesia and the like, the granules being dissolved in water just prior to the use of the preparation; it is understood, however, that other substances are adapted to be formed into granules, and that citrate of magnesia is set forth merely as illustrative.

The best granules which have heretofore been formed were made by hand, manually forcing the paste through a screen with a combined pushing and sliding movement, which causes the paste as it moves through the screen to have a somewhat zigzag effect, thus exposing a large portion of the surface of the material in this granular form, which is considered extremely desirable.

The forcing of a paste through an opening without this combined sliding and pushing motion, causes the same to be squirted through the opening in a solid form which is not readily given to dissolving upon use; and in order to provide the desired granules, I have developed a combined forcing and sliding movement simulating the movement of the hand, and have moved a screen relative to this action which will cause the granules to exude through the screen in a form such as produced by hand, thus accomplishing the manual result by mechanical means; and the following is a detailed description of the present embodiment of this invention, illustrating the preferred means by which these advantageous results may be accomplished.

With reference to the drawings, 10 designates the framework of the machine which is conveniently formed and mounted on legs for the supporting of the parts in use and includes an upper track 11 and a lower track 12. The upper track supports a carrier 13 of generally rectangular shape with side walls 14 having flanges 15 extending therefrom to slide along the track 11 and be guided between the track 11 and the flanged side wall 16 which engages and slidingly guides the wall 14 of the carrier. The bottom of the carrier is in the form of a screen 17 of mesh wire having openings 18 therein of the desired size.

The screen is formed of woven wire 73 suitably flattened at its points of crossing 74 such as by rolling between heavy rolls to provide a smooth surface for the pestle member to work over and prevent a hitching action to disrupt the uniform production of the granules which otherwise might occur. This rolling further locks the wires together to prevent their relative movement.

This carrier is advanced along its track by means of the threaded shaft 19 with which there detachably connects a threaded saddle member 20, the same being connected to the paste carrier by means of a bracket 21 with a slot 22 therein, whereby upon movement of the L-shaped lever 23, the pin 24 slides in the slot 22 and also in a slot 25 in the saddle member 20 to raise or lower the same from engagement with the threaded shaft 19. The carrier 13 is filled with a paste 26 of the work operated upon such as citrate of magnesia, which, without being stirred or disturbed, is mechanically forced through the openings 18 of the screen 17 by a pestle member 27 connected for suitable manipulation.

A shaft 28 is supported above the work in bearings 29 at either side of the machine, and has a crank portion 30 extending over the center portion of the carrier. To this crank portion a head 31 is connected by suitable split bearing means 32 and consists of a plate or web 33 generally T-shape in cross-section extending across the machine and having projecting portions 34 and 35 extending therefrom. This web 33 is provided at each end with generally U-shaped guide 36 which receive a roll 38 mounted upon a pin 37 which is fixed to the arm 39 extending from the framework of the machine. A mounting member 40 is hinged to the portion 35 of the head by means of a pin 41 and has dovetail portions 44 to be received in cooperating guides 75 on the pestle member 27 to mount the same thereon. After the pestle member is mounted on the member 40, the same is swung to the position illustrated in Figure 7, and the bolt 43 which is mounted in the reversely bent end 42 thereof is threaded down to a position to prevent the member 40 from swinging downwardly as illustrated in Figure 9. The member 40 is engaged by a pin 45 and forced downwardly by means of the spring 47, the same being limited by the adjustable nut 46. The pin is guided in bosses 48 carried by one of the arms of the U guide 36. Thus, by the hinge mounting of the member 40 to which the pestle is secured, the pestle member 27 may move toward the flange portion 34 when it encounters a pressure to overcome the force of the spring 47, and after such pressure is relieved, the member 27 will again be returned to the position illustrated in Figure 7 by the spring, the same being limited in its movement by the position of the bolt 43.

From the above it will be observed that as the shaft 29 rotates, the crank 30 will operate the head member to move the same swingingly about the pin 37, and at the same time toward the carrier screen 17 which is also moving to engage the paste 26 from its upper side without stirring or disturbing it and force it through the openings 18 in a somewhat zigzag fashion, as illustrated at 50 in Figure 8, the pestle member having somewhat the movement of the hand which would force the same through the screen in manual operation, and as the screen is smooth on its upper surface, no uneven ripple or hitching action of the pestle therealong occurs, and the granules are evenly formed.

As the granules are forced through the openings, they drop upon the tray 51 which is moved along the track 12 beneath the carrier. The trays 51 are arranged in a train which are supplied from a magazine 52 in which the trays are supported in a horizontal position, and are advanced by means of a sprocket chain 53 having fingers 54 at intervals therealong to engage one end of each tray to move it along with the chain which rests upon the tracks 12. As the bottom tray 55 moves from beneath the trays above the next tray 56 will drop in place to be engaged by the next set of fingers 54, the tray 56 being prevented from being frictionally moved from the magazine by its engagement with the roll 57 positioned a sufficient distance above the chain to permit merely one tray to be moved between it and the chain.

The power is applied to the pulley 58 which is connected directly to the shaft 29 and from this shaft 29 the threaded shaft 19 is driven through miter gears 60, cross shaft 61, ratchet wheel 62, pawl 63, link 64 which is eccentrically mounted on the disk 65 at the end of the shaft 29. The pawl and ratchet mechanism may be adjusted for varying degrees of feed as desired, by shifting the link along the slot 72 in the disk member 65, which variation in feed will vary the size of the granules formed.

The moving means for the trays is also driven from the shaft 61 through a chain 66, sprocket wheel 67, gears 68 and 69, the latter of which is mounted upon shaft 70 upon which is also mounted a sprocket wheel 71 for driving the chain 53.

The trays 51 are moved toward the left of Figure 1, the paste carrier is moved toward the right of Figure 1 as a matter of convenience for the operator, thus permitting the operator to load the paste into the carrier and at the same end of the machine receive the trays which are discharged and taken by the operative to place them in the drying ovens for drying the granules or for such other disposition thereof as is desired, depending upon the work being operated upon.

While I have described certain construction forms which embody the principles of my invention, it is obvious that other desired changes in arrangement may be made within the spirit and the scope of the invention as defined in the oppended claims.

I claim:

1. In a granulating machine, a carrier for the paste from which the granulars are formed having openings therein, a pestle member, a crank arm over said carrier, a head mounted on said crank and having a slot therein, a fixed projection extending into said slot, means for connecting said member to said head, whereby said member is moved toward said carrier and at the same time along said carrier with a combined wiping and pressing motion.

2. In a granulating machine, a carrier for the paste from which the granulars are formed having openings therein, a pestle member, a crank arm over said carrier, a head mounted on said crank and having a slot therein, a fixed projection extending into said slot, yielding means for connecting said member to said head, whereby said member is moved toward said carrier and at the same time along said carrier with a combined wiping and pressing motion, said yielding means permitting said member to be resiliently forced toward said head.

3. In a granulating machine, a carrier for the paste having openings therein, a head movably mounted over said carrier transverse thereto and generally perpendicular to the carrier and having a pestle attached thereto, a member for guiding the movement of said head member, one of said members having an elongated rectilinear slot and the other member having a projection slidably mounted in said slot, said guide member being relatively fixed, and means for relatively moving said head member to cause relative swinging of said members about said projection and relative sliding movement of said projection in said slot.

4. In a granulating machine, a carrier for the paste having openings therein, a head movably mounted over said carrier transverse thereto and generally perpendicular to the carrier, a pestle, yielding means for connecting said pestle to said head member, a member for guiding the movement of said head member, one of said members having an elongated rectilinear slot and the other member having a projection slidably mounted in said slot, said guide member being relatively fixed and means for relatively moving said head member to cause the relative swinging of said members about said projection and relative sliding movement of said projection in said slot.

5. In a granulating machine, a carrier for the paste having openings therein, a head member movably mounted over said carrier, having a slot therein, a pestle secured to said head member, a fixed projection extending into said slot, and means for moving said head to slide it along said projection and at the same time swing it about said projection as a pivot.

RAFFAELE DE ANGELIS.